United States Patent
Chen et al.

(10) Patent No.: US 12,083,560 B2
(45) Date of Patent: Sep. 10, 2024

(54) SORTING-BASED GARBAGE CLASSIFICATION METHOD AND DEVICE

(71) Applicants: Tianjin University of Commerce, Tianjin (CN); Tianjin University, Tianjin (CN)

(72) Inventors: Guanyi Chen, Tianjin (CN); Junyu Tao, Tianjin (CN); Rui Liang, Tianjin (CN); Beibei Yan, Tianjin (CN); Yunan Sun, Tianjin (CN); Zhanjun Cheng, Tianjin (CN); Jian Li, Tianjin (CN); Lan Mu, Tianjin (CN); Yude Gu, Tianjin (CN); Xiaoling Hao, Tianjin (CN)

(73) Assignees: TIANJIN UNIVERSITY OF COMMERCE, Tianjin (CN); TIANJIN UNIVERSITY, Tianjin (CN)

( * ) Notice: Subject to any disclaimer, the term of this patent is extended or adjusted under 35 U.S.C. 154(b) by 390 days.

(21) Appl. No.: 17/545,093

(22) Filed: Dec. 8, 2021

(65) Prior Publication Data
US 2023/0138374 A1 May 4, 2023

(30) Foreign Application Priority Data

Nov. 1, 2021 (CN) .......................... 202111282752.8
Nov. 1, 2021 (CN) .......................... 202111284035.9

(51) Int. Cl.
*B07C 5/02* (2006.01)
*B02C 23/10* (2006.01)
(Continued)

(52) U.S. Cl.
CPC ............ *B07C 5/3422* (2013.01); *B02C 23/10* (2013.01); *B07C 5/02* (2013.01); *B07C 2501/0054* (2013.01); *H04N 7/18* (2013.01)

(58) Field of Classification Search
CPC . B07C 2501/0054; B07C 5/3422; B07C 5/02; B07C 5/34; B07C 5/3408;
(Continued)

(56) References Cited

U.S. PATENT DOCUMENTS 9,886,631 B2 * 2/2018 Dante .................... A24B 15/18
2007/0030953 A1 * 2/2007 Sommer, Jr. ........... G01N 23/06
378/53

(Continued)

FOREIGN PATENT DOCUMENTS

CN 204866599 U * 12/2015
CN 107505285 A * 12/2017 ........... B07C 5/3422
(Continued)

*Primary Examiner* — Gene O Crawford
*Assistant Examiner* — Muhammad Awais
(74) *Attorney, Agent, or Firm* — Pilloff Passino & Cosenza LLP; Rachel K. Pilloff; Sean A. Passino

(57) ABSTRACT

A sorting-based garbage classification method and a sorting-based garbage classification device are provided. The method utilizes quantitative features of domestic garbage components and adopts bubble sort algorithm to build a sorting model to sort and classify domestic garbage. The method is more in line with technical requirements of downstream incineration, pyrolysis gasification and so on, and has the features of high fault tolerance rate and high operation efficiency, and is characterized by controllable environmental impact, flexible product form and high energy utilization efficiency in the operation process.

11 Claims, 2 Drawing Sheets

(51) Int. Cl.
B07C 5/342 (2006.01)
H04N 7/18 (2006.01)

(58) Field of Classification Search
CPC ....... B07C 5/3416; B07C 5/344; B07C 5/342; H04N 7/18; B02C 23/10; B02C 23/08; G06V 10/143; G06V 10/764; G06V 20/64; G06V 10/82; G06V 10/58; Y02W 90/00; G06N 3/08; G06N 3/045; G06F 18/2414
USPC ...................................................... 209/1, 552
See application file for complete search history.

(56) References Cited

U.S. PATENT DOCUMENTS

| | | | | |
|---|---|---|---|---|
| 2015/0224544 A1* | 8/2015 | McGloughlin | ......... | B07C 5/342 209/577 |
| 2016/0078678 A1* | 3/2016 | Hotte | ....... | B07C 7/005 705/7.13 |
| 2016/0252461 A1* | 9/2016 | Balthasar | ............... | G01N 21/85 356/445 |
| 2016/0263624 A1* | 9/2016 | Balthasar | ............... | B07C 5/3416 |
| 2017/0014868 A1* | 1/2017 | Garcia, Jr. | ................ | B07C 5/34 |
| 2017/0174440 A1* | 6/2017 | Ripley | ................... | B65G 43/08 |
| 2018/0365820 A1* | 12/2018 | Nipe | ...................... | G06V 20/10 |
| 2019/0030571 A1* | 1/2019 | Horowitz | ................. | B07C 1/04 |
| 2019/0130560 A1* | 5/2019 | Horowitz | ................ | G06F 18/41 |
| 2019/0299255 A1* | 10/2019 | Chaganti | ................ | G06V 10/56 |
| 2020/0087118 A1* | 3/2020 | Sato | ....................... | B66C 1/0218 |

FOREIGN PATENT DOCUMENTS

| | | | | | |
|---|---|---|---|---|---|
| CN | 110516570 A | * | 11/2019 | .............. | B07C 5/34 |
| CN | 110681610 A | * | 1/2020 | | |
| CN | 111659635 A | * | 9/2020 | | |
| CN | 112495983 A | * | 3/2021 | | |
| CN | 107552412 B | * | 4/2021 | ............. | B07C 5/342 |
| CN | 112605006 A | * | 4/2021 | ............. | B07C 5/342 |
| WO | WO-2017140729 A1 | * | 8/2017 | ............. | B07C 5/344 |
| WO | WO-2021089602 A1 | * | 5/2021 | ............ | B07C 5/3422 |
| WO | WO-2021193483 A1 | * | 9/2021 | ................ | G01J 3/44 |

* cited by examiner

SORTING-BASED GARBAGE CLASSIFICATION METHOD AND DEVICE

TECHNICAL FIELD

The invention relates to the technical field of garbage classification, particularly to a sorting-based garbage classification method and a sorting-based garbage classification device.

BACKGROUND

Dry garbage is a type of energy sources in large quantities which can replace carbon. However, dry garbage, having different calorific value and elements, is diversified in fuel quality, so it needs to be utilized separately. Garbage classification is an important way to realize efficient disposal and use of garbage. At present, there are two main ways of garbage classification and disposal: (1) according to physical features of different components of garbage, such as density and charge, the garbage is sorted by means of wind power and magnetic field; (2) by means of images, sound waves, spectra, etc., types of garbage components are firstly identified, and then the specific components are sorted out in the garbage with push rods, mechanical claws, etc.

However, the above two garbage classification methods have respective defects. For the former, there is no inevitable correlation between the physical features of domestic garbage and its chemical utilization features, so it is difficult to classify domestic garbage in detail according to the demand of downstream disposal and use technology; for the latter, there are some problems such as limited identification accuracy and low sorting efficiency. Therefore, the invention provides a sorting-based garbage classification method and a sorting-based garbage classification device to solve the problems existing in the prior art.

SUMMARY

An objective of the invention is to provide a sorting-based garbage classification method and a sorting-based garbage classification device to solve the above-mentioned problems in the prior art.

In order to achieve the above objective, the invention provides the following solution: the sorting-based garbage classification method includes the following steps:

step 1, feature information acquisition, which specifically includes:

collecting domestic garbage components, and then obtaining quantitative feature results of the domestic garbage components to thereby obtain initial quantitative data of the domestic garbage components;

step 2, information preprocessing, which specifically includes:

processing the initial quantitative data to obtain original hyperspectral data, constructing an information extraction algorithm model, and inputting the original hyperspectral data into the information extraction algorithm model, so as to perform feature compression on the original hyperspectral data, and express the original hyperspectral data by principal components;

step 3: algorithm model optimization, which specifically includes:

optimizing the information extraction algorithm model with parameter indexes, and optimizing the number of the principal components of a feature compression part, and parameters of kernel functions including a linear kernel function, a radial basis kernel function and a polynomial kernel function of support vector classification model to obtain optimum parameter conditions, thereby generating a classification model used for sorting of domestic garbage components according to quantitative feature indexes; and step 4, garbage components sorting, which specifically includes:

grouping domestic garbage components in an ascending or descending order according to the classification model, for subsequent disposal and utilization.

In an embodiment, in the step 2, the method further includes performing noise reduction and dimension reduction processing on the original hyperspectral data after obtaining the original hyperspectral data.

In an embodiment, in the step 3, the parameter indexes include accuracy, precision, recall and F1-measure.

A sorting-based garbage classification device may include a conveying assembly; and a sorting assembly, an identifying assembly and a processing assembly sequentially installed above the conveying assembly from left to right in that order. The sorting assembly may include a fixing frame and lifting cylinders, a lower end of the fixing frame is connected to the conveying assembly, and the lifting cylinders are installed on the fixing frame. The lifting cylinders are distributed in multiple groups. Expandable and contractable ends of the lifting cylinders are provided with rotating cylinders respectively, and rotating ends of the rotating cylinders are provided with S-shaped baffles respectively, and the rotating cylinders are located below the fixing frame, and a cross section of the fixing frame is U-shaped.

The identifying assembly may include an identifying equipment and a fixed seat, a lower part of the identifying equipment is fixedly connected to the fixed seat, and the fixed seat is connected to the conveying assembly.

The processing assembly may include a crushing box and electric heating plates, an inner side of the crushing box is connected to the electric heating plates, and the crushing box is connected to the conveying assembly.

In an embodiment, a cross section of the fixed seat is the same as that of the fixing frame, and an inside of the fixed seat is provided with a capture camera through a bracket, a capturing end of the capture camera faces towards the conveying assembly, and the capture camera is electrically connected to the identifying equipment.

In an embodiment, front and rear sides below the crushing box are equipped with bearing plates respectively, and the bearing plates are connected to the conveying assembly. Upper and lower sides of the crushing box are respectively provided with a feed port and a discharge port. The crushing box is internally provided with two groups of crushing rollers which are oppositely arranged, and the two groups of crushing rollers are rotatably connected to the crushing box and driven by motors.

In an embodiment, the conveying assembly may include a bearing frame and a conveying belt. The bearing frame is connected to the bearing plates, the fixed seat and the fixing frame. An inner side of the bearing frame is provided with the conveying belt and an inner side of the conveying belt is provided with multiple groups of driving rollers driven by a motor, and both ends of the multiple groups of driving rollers are rotatably connected to the bearing frame through bearings.

In an embodiment, left and right sides of the capture camera are respectively equipped with light supplement lamps on the fixed seat, irradiation ends of the light supplement lamps faces a capturing area of the capture camera, and sides of the light supplement lamps far away from the capture camera are respectively equipped with shading plates, and the shading plates are connected to the fixed seat, and a height of each of the shading plate is less than that of the fixed seat.

In an embodiment, a side of each of the electric heating plates close to the crushing rollers is provided with a protective plate with strong thermal conductivity, a triangular plate is arranged below the crushing rollers, front and rear ends of the triangular plate are connected to the crushing box, and a cross section of the triangular plate is an isosceles triangle, and a tip of the triangular plate faces upwards.

In an embodiment, the triangular plate is located just above the discharge port, and the discharge port is located above the conveying assembly. An inner side of the triangular plate is provided with electric heating tubes and the electric heating tubes are electrically connected to the electric heating plates.

In an embodiment, the multiple groups of lifting cylinders are staggeredly distributed.

In an embodiment, an outer side of the crushing box is sleeved with a heatproof sleeve, and a lower part in the crushing box is funnel-shaped.

The invention discloses the following technical effects: the invention utilizes the quantitative features of the domestic garbage components, adopts a bubble sorting algorithm to build the sorting model, carries out sorting classification on domestic garbage, and more meets the technical requirements of downstream incineration, pyrolysis and gasification, etc. Moreover, compared with the machine vision-based classification and identification technology, X-ray-based classification and identification technology, acoustic-based classification and identification technology, magnetic-based classification and identification technology, etc., the method has higher fault tolerance rate and operation efficiency, and is characterized by controllable environmental impact, flexible product form and high energy utilization efficiency during operation.

BRIEF DESCRIPTION OF DRAWINGS

In order to more clearly explain the embodiments of the invention or the technical solution in the prior art, the drawings needed in the embodiments will be briefly introduced below. Apparently, the drawings in the following description are only some embodiments of the invention, and for those skilled in the field, other drawings can be obtained according to these drawings without creative efforts.

Among them: 1: conveying assembly; 2: sorting assembly; 3: identifying assembly; 4: processing assembly; 5: fixing frame; 6: lifting cylinder; 7: rotating cylinder; 8: S-shaped baffle; 9: identifying equipment; 10: fixed seat; 11: crushing box; 12: electric heating plate; 13: capture camera; 14: bearing plate; 15: feed port; 16: discharge port; 17. crushing roller; 18: bearing frame; 19: conveyor belt; 20: light supplement lamp; 21: shading plate; 22: protective plate; 23: triangle plate; 24: electric heating tube; 25. heatproof sleeve.

DETAILED DESCRIPTION OF EMBODIMENTS

Next, the technical solutions in the embodiments of the invention will be clearly and completely described with reference to the accompanying drawings in the illustrated embodiments of the invention. Obviously, the described embodiments are only part of the embodiments of the invention, not all of them. Based on the embodiments in the invention, all other embodiments obtained by those skilled in the field without creative work are within the scope of the invention.

In order to make the above-mentioned objectives, features and advantages of the invention more apparent and easier to understand, the invention will be described in further detail below with reference to the accompanying drawings and detailed description.

Figure 1:
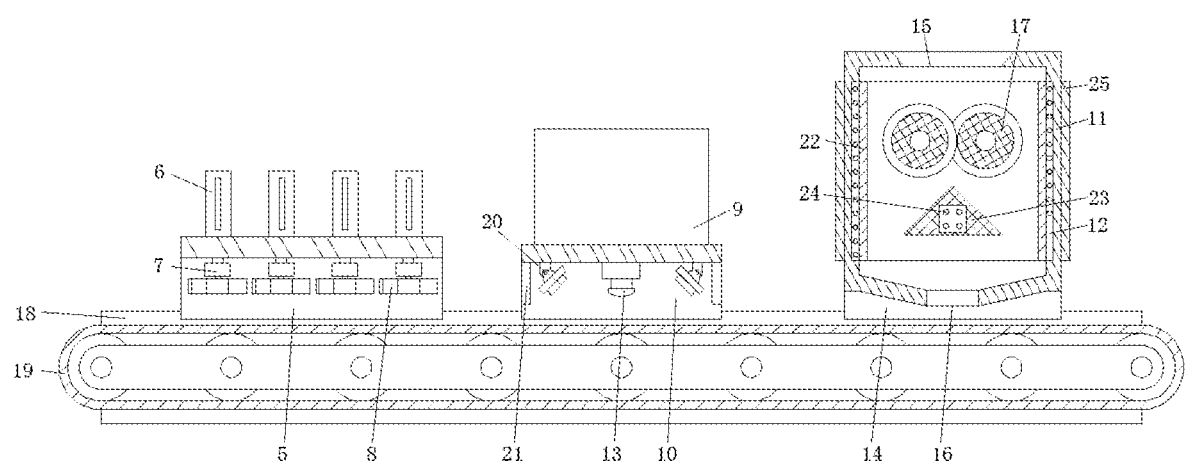
FIG. 1 is a schematic front view of a sorting-based garbage classification device of the invention.
Figure 2:
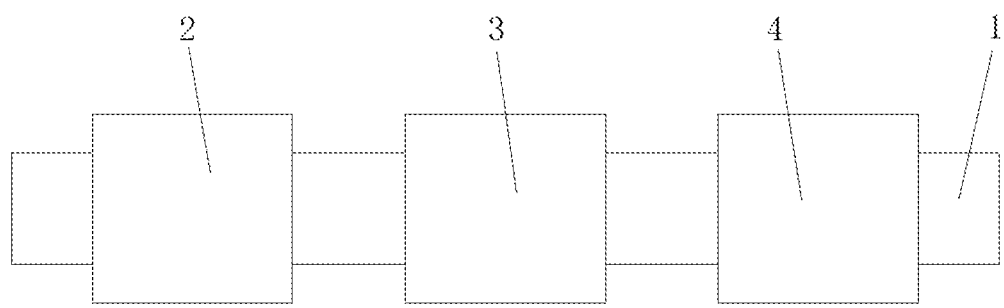
FIG. 2 is a schematic structure diagram of components of a sorting-based garbage classification device of the invention.
Figure 3:
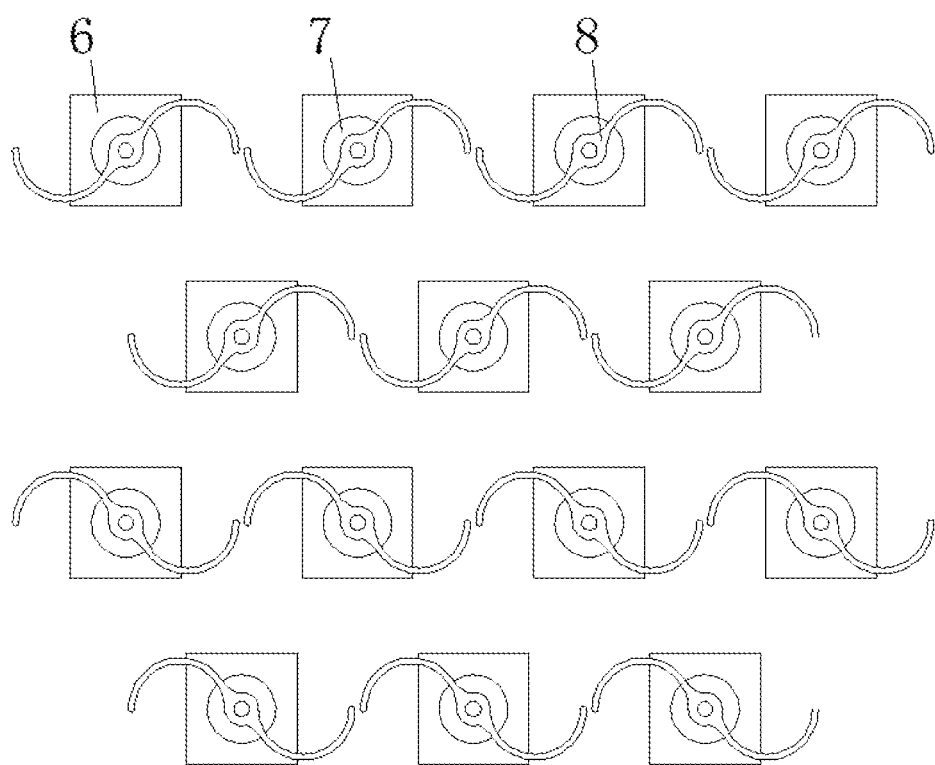
FIG. 3 shows a distribution of lifting cylinders of the invention.

Referring to FIG. 1 through FIG. 3, the invention provides a sorting-based garbage classification method, which includes:

Step 1, Feature Information Acquisition

Specifically, domestic garbage components, which are composed of organic dry waste components and inorganic dry waste components, are collected, then quantitative feature results of the domestic garbage components are obtained by means of characterization analysis, and initial quantitative data of the domestic garbage components is obtained. The characterization analysis means may include one selected from a group consisting of hyperspectral, infrared spectrum and ultraviolet spectrum, and the quantitative feature may include calorific value, carbon-hydrogen ratio, water content, carbon content, hydrogen content, oxygen content, nitrogen content and particle size of samples. The production methods of spectrum include but are not limited to spectrum sum and spectrum camera, so as to obtain the quantitative feature results of the domestic garbage components, that is, the quantitative feature such as calorific value, carbon-hydrogen ratio and water content of samples or their combination.

Step 2, Information Preprocessing

Specifically, the initial quantitative data of the domestic garbage components obtained in the step 1 is preprocessed to obtain original hyperspectral data, an information extraction algorithm model is constructed by adopting a principal component analysis algorithm, and the original hyperspectral data is input into the information extraction algorithm model, so as to carry out feature compression on the original hyperspectral data, with the original hyperspectral data being expressed by principal components. After the original hyperspectral data is obtained, the original hyperspectral data is subject to noise reduction and dimension reduction processing, and the whole step 2 is applied in Python3.8 programming environment for algorithm.

Step 3: Algorithm Model Optimization

Specifically, the information extraction algorithm model extracted in the step 2 with parameter indexes is optimized, the number of the principal component of feature compression part, and parameters of kernel functions including a linear kernel function, a radial basis kernel function and a polynomial kernel function of support vector classification model are optimized, and optimum parameter conditions of model are obtained, so as to generate a classification model, and the domestic garbage components are sorted according to quantitative feature results. The parameter indexes include accuracy, precision, recall rate and F1-measure, and the whole step 3 is used in Python3.8 programming Step 4, Sorting the Domestic Garbage Components Specifically, the domestic garbage is grouped in an ascending or descending order according to the classification model for subsequent disposal and use. A sorting model and a sorting component 2 are built based on a bubble sorting algorithm, and the whole step 4 is executed in Python3.8 programming.

In an illustrated embodiment of the invention, firstly, quantitative features of the domestic garbage components are obtained by characterization means, evaluation indexes are constructed based on quantitative features, the domestic garbage components are sorted according to evaluation indexes, and then domestic garbage components are classified into several categories according to sorting results.

Specifically, the characterization means used to obtain the quantitative features of domestic garbage include direct characterization means, such as elemental analysis, calorific value analysis by infrared analysis, and indirect characterization means such as spectrum, chromatography and mass spectrometry, while elemental analysis includes but is not limited to methods such as organic element analysis and X-ray fluorescence spectrometer.

The quantitative features of domestic garbage include but are not limited to calorific value, carbon-hydrogen ratio, water content, etc., and samples are sorted according to the above features;

The evaluation indexes include a single evaluation index composed of a single quantitative feature and a comprehensive evaluation index obtained by combining various quantitative feature through various mathematical operations.

Then, a principal component analysis algorithm is used to construct the information extraction model, and the original hyperspectral data is input into this model, so that the original hyperspectral data is subjected to feature compression, and several principal components are used to represent the original hyperspectral data, so that the original hyperspectral data can be denoised and reduced in dimension while most of the information is retained, and the average relative error is used as the parameter indexes to optimize the algorithm model and generate the optimal model.

Finally, the domestic garbage components are sorted not only in ascending order, but also in descending order.

Based on the above method, the invention also provides a sorting-based garbage classification device, including a conveying assembly 1; a sorting assembly 2, an identifying assembly 3 and a processing assembly 4 sequentially installed above the conveying component 1 from left to right in that order. The sorting assembly 2 may include a fixing frame 5 and lifting cylinders 6, a lower end of the fixing frame 5 is connected to the conveying assembly 1, and the lifting cylinders 6 are installed on the fixing frame 5 and are distributed in multiple groups. Expandable and contractable ends of the multiple lifting cylinders 6 are provided with rotating cylinders 7 respectively, rotating ends of the rotating cylinders 7 are provided with S-shaped baffles 8 respectively, and the rotating cylinders 7 are located below the fixing frame 5 with a U-shaped cross section. The identifying assembly 3 may include an identifying equipment 9 and a fixed seat 10, a lower part of the identifying equipment 9 is fixedly connected to the fixed seat 10, and the fixed seat 10 is connected to the conveying assembly 1. The processing assembly 4 may include a crushing box 11 and electric heating plates 12, an inner side of the crushing box 11 is connected to the electric heating plates 12, and the crushing box 11 is connected to the conveying assembly 1. During the garbage treatment by the crushing box 11, the electric heating plates 12 are started to raise the temperature in the crushing box 11 to dry garbage and there are two groups of electric heating plates 12, and the two groups of electric heating plates 12 are evenly distributed on both side walls in the crushing box 11.

In an illustrated embodiment, a cross section of the fixed seat 10 is consistent with that of the fixing frame 5, and a capture camera 13 is installed below the fixed seat 10, a capturing end of the capture camera 13 faces towards the conveying assembly 1, and the capture camera 13 is electrically connected to the identifying equipment 9 (e.eg., spectral sorter), and the spectral sorter is used to analyze the quantitative features of garbage, including but not limited to low calorific value, element content, etc.

In an illustrated embodiment, front and rear sides below the crushing box 11 are equipped with bearing plates 14 respectively, and the bearing plates 14 are fixedly connected to the conveying assembly 1. Upper and lower sides of the crushing box 11 are respectively equipped with a feed port 15 and a discharge port 16. Two groups of crushing rollers 17 are arranged in the crushing box 11, the two groups of crushing rollers 17 are rotatably connected to the crushing box 11 and driven by motors. In actual operation, garbage enters from the feed port 15, is crushed by the crushing rollers 17 and dried by the electric heating plates 12.

In an illustrated embodiment, the conveying assembly 1 may include a bearing frame 18 and a conveyor belt 19, the bearing frame 18 is connected to the bearing plates 14, the fixed seat 10 and the fixing frame 5. An inner side of the bearing frame 18 is provided with the conveyor belt 19, and an inner side of the conveyor belt 19 is provided with multiple groups of drive rollers, and the multiple groups of drive rollers are driven by the motor. Both ends of the multiple groups of drive rollers are rotatably connected to the bearing frame 18 through bearings, the multiple groups of drive rollers are connected through sprockets and chains and driven by the motor which may be arranged in multiple groups and change with the length of the conveyor belt 19.

In an illustrated embodiment, left and right sides of the capture camera 13 are respectively equipped with light supplement lamps 20 on the fixed seat 10, irradiation ends of the light supplement lamps 20 faces a capturing area of the capture camera 13, and sides of the light supplement lamps 20 far away from the capture camera 13 are respectively equipped with the shading plates 21, and the shading plates 21 are connected to the fixed seat 10, and a height of each of the shading plates 21 is less than that of the fixed seat 10. When the camera is in service, the capture camera 13 can capture images more clearly with the help of the shading plates 21 and the light supplement lamps 20.

In an illustrated embodiment, a side of each of the electric heating plates close to the crushing rollers is provided with a protective plate 22 with strong thermal conductivity. A triangular plate 23 is arranged below the crushing rollers, and front and rear ends of the triangular plate 23 are connected with the crushing box 11, and a cross section of the triangular plate 23 is an isosceles triangle, and a tip of the triangular plate faces upwards. The main purpose of the protective plates 22 are to prevent the garbage from splashing during the crushing process, and then to strongly protect the electric heating plates 12, insides of the electric heating plates 12 are provided with heating tubes which serve as power supply.

In an illustrated embodiment, the triangular plate 23 is located just above the discharge port 16, and the discharge port 16 is located above the conveying assembly 1. The inner side of the triangular plate 23 is provided with electric heating tubes 24 and the electric heating tubes 24 are electrically connected to the electric heating plates 12. When in operation, when the electric heating plates 12 are started, the electric heating tubes 24 will start with them, and the triangular plates 23 themselves have good thermal conductivity, so that the crushed garbage can be better heated to dry during the falling process. At the same time, the design of the triangular plate 23 can also prolong the duration of the garbage in the crushing box 11.

In an illustrated embodiment, the multiple groups of lifting cylinders are staggeredly distributed. In a further illustrated embodiment, there are fourteen groups of lifting cylinders 6 which are staggeredly distributed in four rows, as shown in FIG. 3.

In an illustrated embodiment, an outer side of the crushing box 11 is sleeved with a heatproof sleeve 25 which can avoid scalding when workers contact with the crushing box 11 and improve safety. In addition, a lower part of the crushing box 11 is funnel-shaped, and the funnel-shaped design facilitates the crushed garbage to fall on the conveyor belt 19 more easily.

In an illustrated embodiment, the identifying equipment 9 is an instrument for obtaining quantitative feature parameters of samples, including but not limited to hyperspectral spectrometers, such as near infrared spectrometers, Raman spectrometers, ultraviolet spectrometers, etc.

The following illustrated embodiment is provided to reflect an application of the above device based on the sorting-based garbage classification method.

Taking the low calorific value of dry garbage component samples in urban cities as an example, firstly, a large number of dry garbage samples are collected from domestic garbage disposal centers in urban cities, and the dry garbage samples are classified and labeled. At the same time, the low calorific value, element content and other data of these dry garbage samples are obtained in advance by referring to the literature related to waste classification and experimental calculation.

Then, the garbage is put into the crushing box 11, crushed by the crushing rollers 17, and at the same time, the garbage is dried by the electric heating plates 12 and the electric heating tubes 24. The data of processed garbage samples such as low calorific value, carbon-hydrogen ratio and water content, are obtained through related literature retrieval or experiments, and the prediction algorithm of the quantitative feature prediction component is trained, so that the model algorithm for quantitative prediction is obtained.

Next, another garbage samples to be predicted is subject to identification by the identifying equipment 9 of the identifying assembly 3 to thereby get the quantitative feature results of each region in each broken garbage sample, the initial quantitative data are obtained, and the quantitative features include but are not limited to calorific value, carbon-hydrogen ratio, water content, etc. The initial quantitative data is preprocessed, information extraction algorithm model is constructed by using the principal component analysis algorithm, the original hyperspectral data is input into the algorithm model, so as to perform feature compression on the original hyperspectral data, express the original data by the principal component, optimize the extracted algorithm model by the parameter indexes, and optimize the principal component number, linear kernel function, radial basis kernel function and polynomial kernel function parameters of the feature compression part to obtain the optimum parameter conditions of the module model, thus generating the classification model.

And then the domestic garbage components are sorted according to the quantitative feature indexes. The sorting assembly 2 is composed of several groups of S-shaped baffles 8 which can be lifted and rotated. The lifting and rotating process is completed by the lifting cylinders 6 and the rotating cylinders 7. The mechanical baffle array which can be lifted and rotated determines whether to lower and rotate by 180 degrees according to the quantitative feature sizes of the wastes on both sides of the baffles.

Finally, according to the sorting and classification results, theoretically, by using the baffle array of (n−1) rows×(n−1) columns, the dried domestic garbage particles can be divided into N groups in ascending or descending order of quantitative features.

In the description of the invention, it should be understood that the orientation or position indicated by the terms "vertical", "horizontal", "up", "down", "front", "back", "left", "right", "vertical", "horizontal", "top", "bottom", "inside" and "outside" is based on the drawings, and the above terms are only for the convenience of describing the invention, and do not indicate or imply that the indicated device or element must have a specific orientation, be constructed and operated in a specific orientation, so it cannot be understood as a limitation of the invention.

The above-mentioned embodiments only describe the illustrated mode of the invention, and do not limit the scope of the invention. Without departing from the design spirit of the invention, all kinds of modifications and changes made by those skilled in the field to the technical solution of the invention should fall within the protection scope determined by the claims of the invention.

What is claimed is:

1. A sorting-based garbage classification device, comprising:
a conveying assembly (1); and a sorting assembly (2), an identifying assembly (3) and a processing assembly (4) sequentially installed above the conveying assembly (1) from left to right in that order;
wherein the sorting assembly (2) comprises a fixing frame (5) and lifting cylinders (6), a lower end of the fixing frame (5) is connected to the conveying assembly (1), and lifting cylinders (6) are installed on the fixing frame (5); the lifting cylinders (6) are distributed in a plurality of groups, expandable and contractable ends of the lifting cylinders (6) are provided with rotating cylinders (7) respectively; rotating ends of the rotating cylinders (7) are provided with S-shaped baffles (8) respectively, the rotating cylinders (7) are located below the fixing frame (5), and a cross section of the fixing frame (5) is U-shaped;
wherein the identifying assembly (3) comprises an identifying equipment (9) and a fixed seat (10), a lower part of the identifying equipment (9) is fixedly connected to the fixed seat (10), and the fixed seat (10) is connected to the conveying assembly (1); and
wherein the processing assembly (4) comprises a crushing box (11) and electric heating plates (12), an inner side of the crushing box is connected to the electric heating plates (12), and the crushing box is connected to the conveying assembly (1);
wherein the device is based on a sorting-based garbage classification method, comprising:
step 1, feature information acquisition, comprising:
collecting domestic garbage components firstly, and then obtaining quantitative feature results of the domestic garbage components, to thereby obtain initial quantitative data of the domestic garbage components;

step 2, information preprocessing, comprising:
  preprocessing the initial quantitative data to obtain original hyperspectral data, constructing an information extraction algorithm model, and inputting the original hyperspectral data into the information extraction algorithm model to carry out feature compression on the original hyperspectral data and express the original hyperspectral data by principal components;
step 3, algorithm model optimization, comprising:
  optimizing the information extraction algorithm model with parameter indexes, and optimizing the number of the principal components of a feature compression part, and parameters of kernel functions including a linear kernel function, a radial basis kernel function and a polynomial kernel function of support vector classification model to obtain optimum parameter conditions, thereby generating a classification model used for sorting of domestic garbage components according to quantitative feature indexes; and
step 4, garbage components sorting, comprising:
  grouping domestic garbage components in an ascending or descending order according to the classification model for subsequent disposal and utilization.

2. The sorting-based garbage classification device according to claim 1, wherein in the step 2, further comprising:
  performing noise reduction and dimension reduction processing on the original hyperspectral data after obtaining the original hyperspectral data.

3. The sorting-based garbage classification device according to claim 1, wherein in the step 3, the parameter indexes comprise accuracy, precision, recall and F1-measure.

4. The sorting-based garbage classification device according to claim 1, wherein a cross section of the fixed seat (10) is consistent with that of the fixing frame (5), a capture camera (13) is installed on an inner side of the fixed seat (10) through a bracket, a capturing end of the capture camera (13) faces towards the conveying assembly (1), and the capture camera (13) is electrically connected to the identifying equipment (9).

5. The sorting-based garbage classification device according to claim 1, wherein front and rear sides below the crushing box (11) are equipped with bearing plates (14), and the bearing plates (14) are fixedly connected to the conveying assembly (1); upper and lower sides of the crushing box (11) are respectively equipped with a feed port (15) and a discharge port (16); two groups of crushing rollers (17) are oppositely arranged in the crushing box (11); and the two groups of crushing rollers (17) are rotatably connected to the crushing box (11) and driven by motors.

6. The sorting-based garbage classification device according to claim 5, wherein the conveying assembly (1) comprises a bearing frame (18) and a conveyor belt (19), and the bearing frame (18) is connected to the bearing plates (14), the fixed seat (10) and the fixing frame (5); an inner side of the bearing frame (18) is provided with the conveyor belt (19), and an inner side of the conveyor belt (19) is provided with multiple groups of drive rollers, and the multiple groups of drive rollers are driven by a motor; both ends of the multiple groups of drive rollers are rotatably connected to the bearing frame (18) through bearings.

7. The sorting-based garbage classification device according to claim 4, wherein left and right sides of the capture camera (13) are respectively equipped with light supplement lamps (20) on the fixed seat (10), irradiation ends of the light supplement lamps (20) face a capturing area of the capture camera (13), sides of the light supplement lamps (20) away from the capture camera (13) are respectively equipped with shading plates (21), the shading plates (21) are connected to the fixed seat (10), and a height of each of the shading plates (21) is less than that of the fixed seat (10).

8. The sorting-based garbage classification device according to claim 5, wherein a side of each of the electric heating plates (12) close to the crushing rollers (17) is provided with a protective plate (22) being thermally conductive, a triangular plate (23) is arranged below the crushing rollers (17), front and rear ends of the triangular plate (23) are connected to the crushing box (11), a cross section of the triangular plate (23) is an isosceles triangle, and a tip of the triangular plate (23) faces upwards.

9. The sorting-based garbage classification device according to claim 8, wherein the triangular plate (23) is located just above the discharge port (16), and the discharge port (16) is located above the conveying assembly (1); an inner side of the triangular plate (23) is provided with electric heating tubes (24), and the electric heating tubes (24) are electrically connected to the electric heating plates (12).

10. The sorting-based garbage classification device according to claim 1, wherein the lifting cylinders (6) are staggeredly distributed.

11. The sorting-based garbage classification device according to claim 1, wherein an outer side of the crushing box (11) is sleeved with a heatproof sleeve (25), and a lower part of the crushing box (11) is funnel-shaped.

* * * * *